US012673572B2

(12) United States Patent (10) Patent No.: US 12,673,572 B2
Askin et al. (45) Date of Patent: Jul. 7, 2026

(54) VEHICLE DOCKING STRUCTURE WITH A PASSIVE LATCHING SYSTEM

(71) Applicant: Lyft, Inc., San Francisco, CA (US)

(72) Inventors: Erik Keith Askin, San Francisco, CA (US); Jeffrey Alan Boyd, San Rafael, CA (US); Alexander Timothy Dixon, San Anselmo, CA (US); Robert Andrew Ewaschuk, Brooklyn, NY (US); Emily Christina Figurski, Santa Cruz, CA (US); Tristin Kim, Palo Alto, CA (US); Scott McDaid, San Francisco, CA (US); Oliver Maximilian Mueller, San Francisco, CA (US); Neil Richard Anthony Saldanha, San Francisco, CA (US); Andrea Claude Ramos Santos, San Francisco, CA (US); Ulhas Subramaniam, Fremont, CA (US); Joseph Daniel Taylor, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 93 days.

(21) Appl. No.: 18/196,394

(22) Filed: May 11, 2023

(65) Prior Publication Data

US 2023/0365015 A1 Nov. 16, 2023

Related U.S. Application Data

(60) Provisional application No. 63/342,040, filed on May 13, 2022.

(51) Int. Cl.
 *B60L 53/36* (2019.01)
 *B60L 53/31* (2019.01)

(52) U.S. Cl.
 CPC ............... *B60L 53/36* (2019.02); *B60L 53/31* (2019.02); *B60L 2200/22* (2013.01); *B60L 2200/24* (2013.01); *B60L 2270/36* (2013.01)

(58) Field of Classification Search
 CPC ...... B60L 53/36; B60L 53/31; B60L 2200/22; B60L 2200/24; B60L 2270/36
 See application file for complete search history.

(56) References Cited

U.S. PATENT DOCUMENTS

2008/0156050 A1 7/2008 Konno
2019/0127002 A1 5/2019 Bettez
 (Continued)

FOREIGN PATENT DOCUMENTS

CN 205417863 U 8/2016
CN 211422148 U 9/2020
 (Continued)

OTHER PUBLICATIONS

International Search Report and Written Opinion for International Application No. PCT/US2023/021915, 12 pages.

*Primary Examiner* — Carlos Amaya
(74) *Attorney, Agent, or Firm* — Baker Botts L.L.P.

(57) ABSTRACT

Systems and methods related to docking stations for accommodating multiple types of micromobility vehicles, for interacting with different users, and for operating securely under low-power constraints are disclosed. A low-power docking station may include a housing having walls defining a vehicle opening, and a latching receiver to engage with a latching mount of the micromobility vehicle when it is positioned in the vehicle opening. The docking station can further include a movable hook having a retention feature and a movable latch having a latching protrusion and a receiving feature. The receiving feature can be configured to receive the latching mount when the latching mount is advanced into the receiving feature, and in response to the (Continued)

receiving feature receiving the latching mount, the movable latch can move such that the latching protrusion of the movable latch is retained by the retention feature of the movable hook.

20 Claims, 12 Drawing Sheets

(56) References Cited

U.S. PATENT DOCUMENTS

| 2019/0344849 | A1 | 11/2019 | Weiershausen | |
| 2020/0031247 | A1* | 1/2020 | Moravick | ............... B60L 53/31 |

FOREIGN PATENT DOCUMENTS

| CN | 213391604 | U | 6/2021 |
| KR | 100853704 | B1 | 8/2008 |

* cited by examiner

VEHICLE DOCKING STRUCTURE WITH A PASSIVE LATCHING SYSTEM

PRIORITY

This application claims the benefit under 35 U.S.C. § 119(e) of U.S. Provisional Patent Application No. 63/342,040, filed 13 May 2022, which is incorporated herein by reference.

BACKGROUND

Traditional configurations for docking stations rely on a centralized power source (e.g., electrical grid, battery) and a kiosk that utilizes a centralized communication module to support its docking mechanism. There is a reliability concern with such centralized configurations since they have a single point of failure that could render unavailable every micromobility vehicle docked at the station (e.g., bikes, scooters, and etc.). Moreover, due to relying upon the centralized power source, the initial costs involved with the centralized configuration make it only feasible to deploy docking stations at heavily populated areas and less feasible at less populated areas where only a few docks may be required. Furthermore, docking stations connected to the electrical grid require higher deployment costs and are less flexible on where they can be deployed (e.g., only where the electrical grid is available), and docking stations supported by a battery require additional labor costs, for example, due to the necessary battery swaps every so often (e.g., on a monthly basis). Accordingly, there is a need for a new dock or a docking station that is more reliable and flexible in terms of where it can be deployed.

SUMMARY

Systems and methods related to docking stations for accommodating multiple types of micromobility vehicles, for interacting with different users, and for operating securely under low-power constraints are disclosed. In particular embodiments, a low-power docking station for a micromobility vehicle is disclosed, the low-power docking station including a housing having walls that define a vehicle opening configured to receive a portion of the micromobility vehicle. The low-power docking station can also include a latching receiver configured to engage with a latching mount of the micromobility vehicle when the portion of the micromobility vehicle is positioned in the vehicle opening. The docking station can further include a movable hook having a retention feature and a movable latch having a latching protrusion and a receiving feature. The receiving feature can be configured to receive the latching mount when the latching mount is advanced into the receiving feature, and in response to the receiving feature receiving the latching mount, the movable latch can move such that the latching protrusion of the movable latch is retained by the retention feature of the movable hook. The docking station can further include a low-power locking architecture coupled to the latching receiver and capable of locking the micromobility vehicle via the latching receiver. The low-power locking architecture can include an actuator for positioning the movable hook in a first position for engaging the movable latch and a second position for disengaging the movable hook from the movable latch. The low-power locking architecture can further include a low-power interface disposed on the housing and configured to provide a status of the latching receiver in response to the micromobility vehicle being locked via the latching receiver.

In particular embodiments, which may combine the features of some or all above embodiments, the actuator can include a linear actuator or a rotary actuator. In particular embodiments, which may combine the features of some or all above embodiments, the low-power locking architecture can determine whether the micromobility vehicle is authorized to be latched to the docking station prior to the low-power locking architecture locking the micromobility vehicle. In particular embodiments, which may combine the features of some or all above embodiments, the low-power locking architecture can include a motor configured to provide a selective switching of the movable hook between the first position and the second position based on a signal received from a controller. In particular embodiments, which may combine the features of some or all above embodiments, the low-power locking architecture can further include a motor switch corresponding to the motor, a hook switch corresponding to the movable hook, and a latch switch corresponding to the movable latch, wherein each of the motor switch, the hook switch, and the latch switch can be communicatively coupled with the controller and configured to provide a respective positional information to the controller.

In particular embodiments, which may combine the features of some or all above embodiments, a low-power docking station for a micromobility vehicle is disclosed, the low-power docking station including a housing having walls that define a vehicle opening capable of receiving a portion of the micromobility vehicle, and a latching receiver configured to engage with a latching mount of the micromobility vehicle when the portion of the micromobility vehicle is positioned in the vehicle opening. The latching receiver can further include a movable hook having a retention feature, a rotatable cam configured to selectively engage with the movable hook, and a movable latch having a latching protrusion and a receiving feature. The receiving feature can be configured to receive the latching mount when the latching mount is advanced into the receiving feature, and in response to the receiving feature receiving the latching mount, the movable latch can be configured to move such that the latching protrusion of the movable latch is retained by the retention feature of the movable hook. The low-power docking station can further include a low-power locking architecture coupled to the latching receiver and capable of locking the micromobility vehicle via the latching receiver, the low-power locking architecture including an actuator for rotating the rotatable cam among several cam positions, and a low-power interface disposed on the housing and configured to provide a status of the latching receiver.

In particular embodiments, which may combine the features of some or all above embodiments, the docking station can further include a hook biasing member and a latch biasing member, wherein the movable hook can be biased toward a first hook position by the hook biasing member and the movable latch can be biased toward a first latch position by the latch biasing member. In particular embodiments, which may combine the features of some or all above embodiments, the hook biasing member and the latch biasing member can each comprise a respective spring.

In particular embodiments, which may combine the features of some or all above embodiments, in a first cam position of the plurality of cam positions, the rotatable cam can engage with the movable hook such that the movable latch is configured to receive the latching mount of the micromobility vehicle when the latching receiver is unoccupied by the micromobility vehicle, and such that the movable latch can retain the latching mount of the micromobility vehicle when the latching mount is advanced into the receiving feature of the movable latch, thereby latching the micromobility vehicle. In particular embodiments, which may combine the features of some or all above embodiments, in a first cam position of the plurality of cam positions, the movable latch can be retained at a second latch position by the retention feature of the movable hook when the latching mount is advanced into the receiving feature, thereby latching the micromobility vehicle, the movable latch retained against a biasing action of the latch biasing member.

In particular embodiments, which may combine the features of some or all above embodiments, in a second cam position of the plurality of cam positions, the rotatable cam can engage with the movable hook such that the movable latch prevents retention of the latching mount when the latching mount is advanced into the receiving feature, or such that the movable latch releases the latching mount. In particular embodiments, which may combine the features of some or all above embodiments, in a second cam position of the plurality of cam positions, the rotatable cam can act to position the movable hook at a second hook position against a biasing action of the hook biasing member.

In particular embodiments, which may combine the features of some or all above embodiments, in a third cam position of the plurality of cam positions, the rotatable cam can engage with the movable hook such that the movable hook can prevent a positional change of the movable latch, thereby preventing the movable latch from receiving the latching mount when the latching receiver is unoccupied by the micromobility vehicle, and thereby locking the latching mount within the latching receiver when the latching receiver is occupied by the micromobility vehicle.

In particular embodiments, which may combine the features of some or all above embodiments, the low-power locking architecture can be configured to determine whether the micromobility vehicle is authorized to be docked to the docking station prior to the low-power locking architecture locking the micromobility vehicle. In particular embodiments, which may combine the features of some or all above embodiments, the low-power locking architecture can include a motor configured to selectively rotate the rotatable cam based on a corresponding signal received from a controller. In particular embodiments, which may combine the features of some or all above embodiments, the low-power locking architecture can further include a motor switch corresponding to the motor and the rotatable cam, a hook switch corresponding to the movable hook, and a latch switch corresponding to the movable latch, wherein each of the motor switch, the hook switch, and the latch switch is communicatively coupled with the controller and configured to provide a respective positional information to the controller.

According to particular embodiments, which may combine the features of some or all above embodiments, a method of operating a low-power docking station for a micromobility vehicle can include the steps of determining whether the micromobility vehicle is authorized to be docked to a latching receiver of the docking station; in a first position of a rotatable cam of the latching receiver, receiving a latching mount of the micromobility vehicle by a movable latch of the latching receiver and based on the latching receiver being unoccupied, wherein the rotatable cam can be selectively engaged with a movable hook having a retention feature, and wherein the movable latch has a latching protrusion and a receiving feature, the receiving feature configured to selectively receive the latching mount, the latching protrusion of the movable latch selectively retainable by the retention feature of the movable hook; and retaining the latching mount of the micromobility vehicle by the movable latch and based on the latching receiver being occupied.

In particular embodiments, which may combine the features of some or all above embodiments, the method of operating the low-power docking station can include, in a second position of the rotatable cam, preventing retention of the latching mount of the micromobility vehicle by the movable latch and based on the latching receiver being unoccupied; and releasing the latching mount of the micromobility vehicle by the movable latch and based on the latching receiver being occupied. In particular embodiments, which may combine the features of some or all above embodiments, the method of operating the low-power docking station can include, in a third position of the rotatable cam, preventing receipt of the latching mount of the micromobility vehicle by the movable latch and based on the latching receiver being unoccupied; and locking the latching mount of the micromobility vehicle by the movable latch and based on the latching receiver being occupied.

In particular embodiments, which may combine the features of some or all above embodiments, the method of operating the low-power docking station can include biasing the movable hook toward a first hook position by a hook biasing member; and biasing the movable latch toward a first latch position by a latch biasing member. In particular embodiments, which may combine the features of some or all above embodiments, the method of operating the low-power docking station can include selectively sensing a respective positional information corresponding to one or more of the rotatable cam, the movable hook, and the movable latch by a controller, based on one or more of a motor switch, a hook switch, and a latch switch communicatively coupled with the controller. In particular embodiments, which may combine the features of some or all above embodiments, the method of operating the low-power docking station can include providing a status of the latching receiver by a low-power interface of the docking station.

DESCRIPTION OF EXAMPLE EMBODIMENTS

Figure 1:
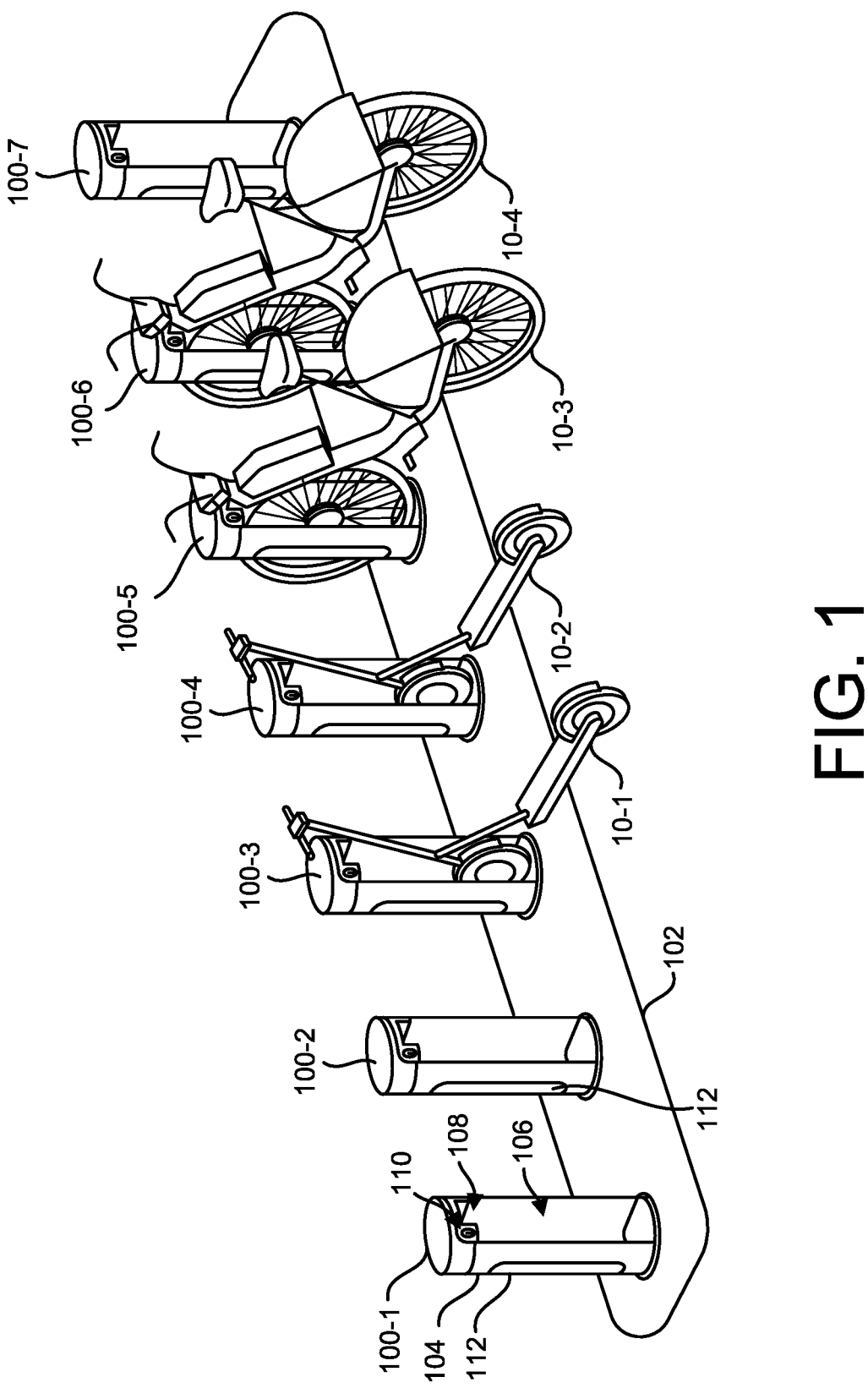
FIG. 1 illustrates a perspective schematic view of a plurality of docking stations coupled to an exemplary base that may include components described herein, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or illustrated herein can be claimed in a separate claim and/or in any combination with any embodiment or feature described or illustrated herein or with any of the features of the attached claims.

The architecture of a self-sufficient docking station disclosed herein provides a technical solution to the issues involved with docking stations for accommodating multiple types of micromobility vehicles, for interacting with different users, and for operating securely under low-power constraints. Embodiments address the above-mentioned issues with a docking station with a passive latching mechanism and a low-power locking architecture and/or verification system to improve the user experience and provide greater security of the docking station. A passive latching mechanism requires no electric power to receive a micromobility vehicle, but can still accommodate variations in how aggressively a user wants to engage a micromobility vehicle in the docking station and the user is not delayed by the latching mechanism. In other words, the micromobility vehicle may be latched to the docking station using a passive latching mechanism (i.e., does not require battery/electrical power) by the user merely advancing the latching mount of the micromobility vehicle into a retaining feature of the passive latching mechanism of the docking station. As a result of the micromobility vehicle being latched to the docking station, another user cannot remove the micromobility vehicle from the docking station. Thereafter, a low-power locking architecture may be implemented to securely lock the micromobility vehicle to the docking station. The use of the passive latching mechanism enables a user to quickly latch the micromobility vehicle to the docking station without the docking station having to perform an electronic authentication or validation process to ensure that the micromobility vehicle is authorized to park at the docking station. Beneficially, the lack of an authentication or validation process significantly minimizes user error as conventional authentication or validation process may require that the user hold the micromobility vehicle in place in the docking station for a prolonged duration of time (e.g., greater than 1 second) in order for a sensor of the conventional docking station to read the micromobility vehicle, which may be inconvenient if the user is in a rush to go somewhere else. Conversely, if an authentication or validation process were used in conjunction with the latching mechanism, the latching mechanism would require electrical or battery power, which may increase cost of components, reduce reliability of micromobility vehicle latching, and increase time required to latch the micromobility vehicle.

As described herein, the micromobility vehicle may be first latched to the passive latching mechanism of the docking station. Subsequently, the micromobility vehicle may be locked to the docking station using a low-power locking architecture. While latched, the micromobility vehicle cannot be forcefully removed by another individual from the docking station. However, subsequent to the micromobility vehicle being latched, the docking station may undergo a self validation/authentication process to determine if the micromobility vehicle should be latched to the docking station based on an indicator (e.g., RF tag) of the micromobility vehicle. If the micromobility vehicle fails to pass the validation/authentication process, then the docking station may be configured to release the passive latching mechanism so as to release the micromobility vehicle from the docking station. In this manner, the docking station utilizes the passive latching mechanism and a controller for performing validation/authentication to determine if the micromobility vehicle is to be locked to the docking station. As used herein, the term "latched" may refer to retaining the micromobility vehicle to the docking station so that it may undergo a subsequent "locking" process.

The low-power locking architecture may be configured to operate using only electric power from a battery that can be charged using solar power, including indirect light. To lock a micromobility vehicle using low-power, a docking station may have sensors that require little power (relative to conventional docking stations) to determine when a micromobility vehicle is latched in the docking station. Specifically, the use of low-power may be implemented to move (e.g., rotate) an actuator for locking the passive latching mechanism in place such that the micromobility vehicle cannot be released from the docking station without an unlock signal generated by the controller of the docking station. The controller in the docking station confirms from the sensors when a micromobility vehicle is latched before sending a signal to lock the micromobility vehicle. In comparison, conventional locking architectures may require significantly more power as is required to both latch and lock the micromobility vehicle to the docking station. A controller may use the same or other sensor readings from the locking architecture to determine a state of the docking station and to verify a micromobility vehicle is positioned correctly in the docking station. If vehicle verification is not successful, the locking system may prevent locking a micromobility vehicle. The docking station also uses low power indicators to signal when a micromobility vehicle in the docking station is available, reserved or unavailable or when a docking station is available to receive a micromobility vehicle.

Embodiments described herein disclose a self-sufficient, independently-operated dock with improved reliability, low operation costs, and flexibility to be deployed in both high- or low-density areas, all without requiring a kiosk, a centralized power source, or underground power and communication infrastructure. As used herein, the term "self-sufficient" may refer to a dock capable of independently generating sufficient power to power its various docking functionalities without requiring or using power generated by other docks or a power source external to the dock. In some embodiments, the various docking functionalities include locking a micromobility vehicle at a docking station, unlocking the micromobility vehicle from the docking station, configuring a docking station to remain in a held open state, configuring a docking station to remain in a latching state and communicating with a transportation management system (e.g., to indicate the status of a docking station as held open, unlatched, latched, locked or unlocked and/or any fault conditions), but the docking functionalities may not include charging a micromobility vehicle.

In some embodiments, the various docking functionalities may also include charging the micromobility vehicle. A docking station may include a "housing structure" that may take the form of a bollard. A docking station may be configured with one or more solar panels, a battery, a charging system, a passive latching mechanism and a low-power locking mechanism and communication system, allowing it to be self-sufficient and independently deployable (even in low-density areas). The solar panels may be configured to draw power from ambient or diffuse light and do not require direct sunlight to supply the necessary power to operate the various docking functionalities. The solar panels may also be oriented vertically relative to the ground or the platform of the docking station to allow the space above the docking station to be freed and occupied by portions of a micromobility vehicle, such as a basket on a bicycle. In some examples, the solar panels may be diagonally oriented (i.e., any angle range greater than 0 degrees to less than 90 degrees between the light-absorbing surface of the solar panel relative to the surface of the ground or the dock platform). Given that the solar panels do not require direct sunlight, docking stations can be positioned close to each other or close to other non-docking structures that could potentially block direct sunlight, as may be often present in high-density areas. The vertical orientation or diagonal orientation is also beneficial since it provides natural resistance to dust buildup over the solar panels, or in high latitude or altitude markets, snow buildup. A docking station may also be configured to be connected to an external power source to provide the capability to charge electrical vehicles (e.g., bikes, scooters, etc.) although it should be noted in some examples the self-sufficient docking stations described herein may generate sufficient power to charge electrical vehicles FIG. 1 illustrates a perspective schematic view of a plurality of low-power docking stations 100 coupled to base 102, wherein each docking station 100 is configured to receive, dock and lock any micromobility vehicle 10 of a plurality of types of micromobility vehicles 10. Examples of types of micromobility vehicles 10 include scooters (such as micromobility vehicles 10-1 and 10-2) and bicycles (such as micromobility vehicles 10-3 and 10-4), and may include other types (not shown). Each docking station 100 generally comprises a housing 104, such as a bollard with walls, that define vehicle opening 106 for receiving a micromobility vehicle 10, a receiver 108 for engaging with a micromobility vehicle 10, and interface 110 for communicating information to a user. Some embodiments may include solar panel 112 for providing power to components of docking station 100.

When a user wants to use a micromobility vehicle 10, they may want to know which micromobility vehicles 10 are available. In some situations, the user may have reserved a micromobility vehicle 10 using an app, wherein they may approach base 102 and want to know which micromobility vehicle 10 is the one they reserved. In other situations, a user may approach base 102 that has multiple micromobility vehicles 10 and want to use any available micromobility vehicle 10. For example, micromobility vehicle 10-1 may be available for use but micromobility vehicles 10-2, 10-3, and 10-4 may have already been reserved by other users or may be designated for service and therefore unavailable. Docking stations 100 may communicate information to a user using a communication system such as interface 110.

When a user is finished using a micromobility vehicle 10, they want to dock the micromobility vehicle 10 in a docking station 100. In some situations, the user may have designated a final location for the micromobility vehicle 10 using an app, wherein they may approach base 102 at the final location and want to know which docking station 100 that micromobility vehicle 10 can be positioned in. In other situations, the user may not have provided a final location or may have changed their final location and approach base 102 having multiple docking stations 100 and want to dock micromobility vehicle 10 in any docking station that is not reserved. For example, docking station 100-2 may have been reserved by a first user but docking station 100-7 may be available for any user to dock a micromobility vehicle 10.

When docking micromobility vehicles 10 to docking stations 100, users vary in how aggressively they insert micromobility vehicle 10 in vehicle opening 106, including how fast the micromobility vehicle 10 is advanced into vehicle opening 106 and with how much force micromobility vehicle 10 is inserted into receiver 108. Furthermore, some users may advance micromobility vehicles 10 straight into docking stations 100 but other users may advance micromobility vehicles 10 into docking stations 100 at some angle relative to vehicle opening 106. Additionally, users generally do not want to spend additional time or make multiple attempts to ensure micromobility vehicles 10 are properly secured in docking stations 100. Receiver 108 enables users to easily advance a micromobility vehicle 10 into docking station 100.

Figure 2:
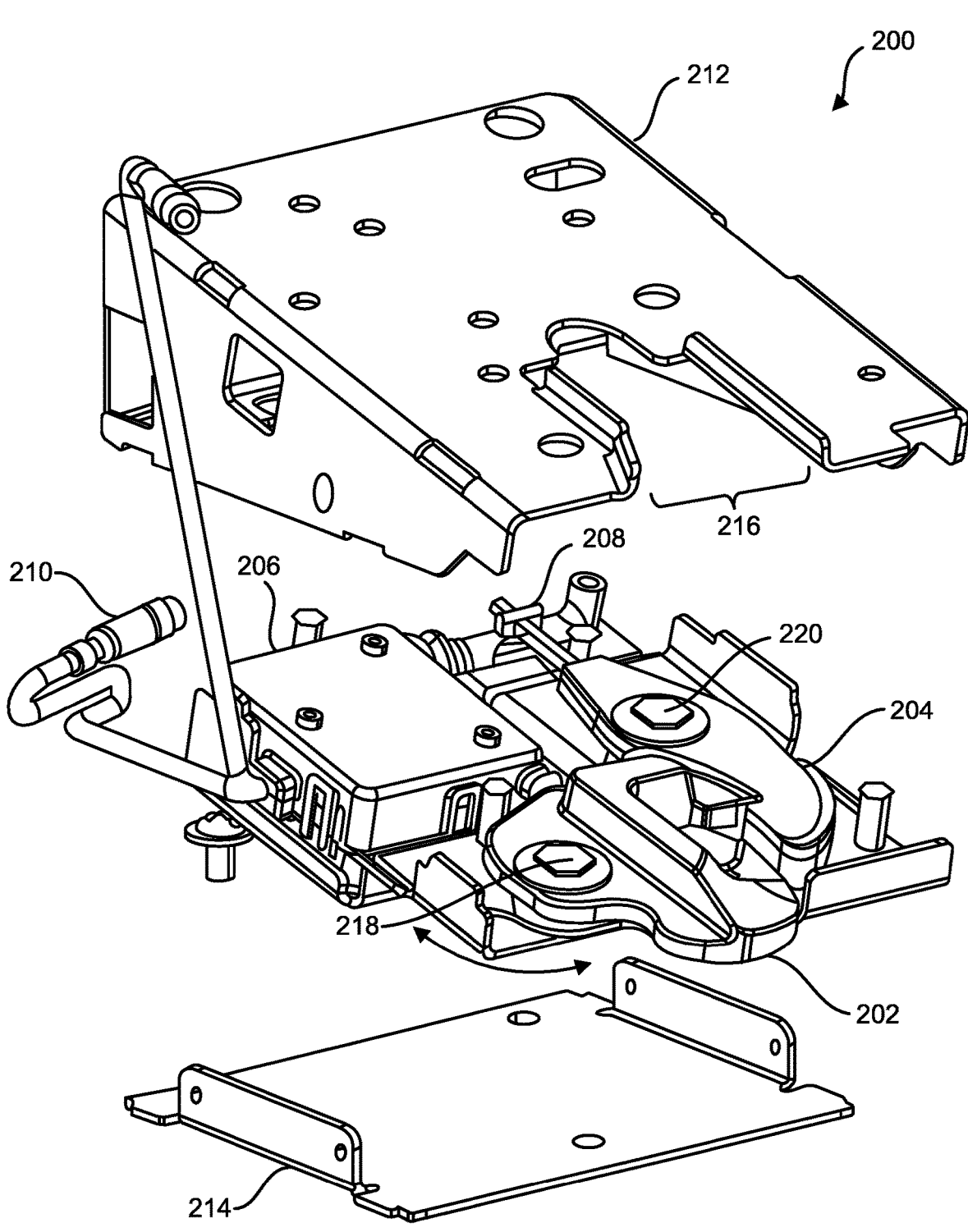
FIG. 2 illustrates an exploded perspective schematic view of one embodiment of a latching mechanism with a low-power locking architecture, according to some embodiments.

FIG. 2 illustrates an exploded perspective schematic view of a passive latching mechanism 200 that may form part of receiver 108. Latching mechanism 200 may not require any power to latch a micromobility vehicle 10 in docking station 100. Latching mechanism 200 comprises latch 202, hook 204 and actuator 206 connected to hook 204 by connector 208. Latching mechanism 200 further comprises a low-power locking architecture and verification system including cable 210 coupling actuator 206 to a power source and communications system (not shown). Latching mechanism 200 and a portion of a low-power locking architecture and verification system may be positioned between upper housing 212 and lower housing 214 to protect latching mechanism 200 from unwanted access or vandalism.

Figure 3A:
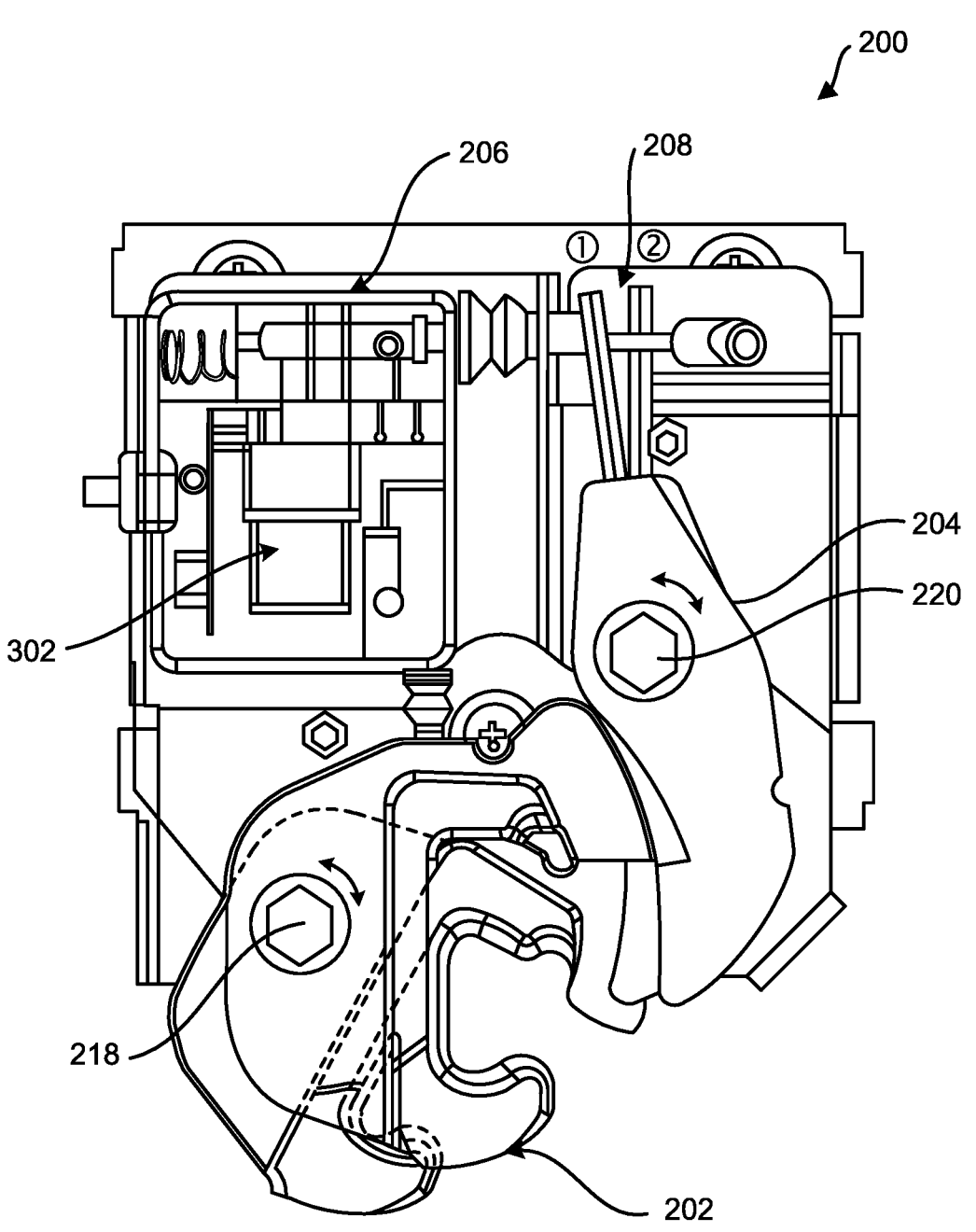
FIG. 3A illustrates a bottom schematic view of one embodiment of a latching mechanism with a low-power locking architecture, according to some embodiments.
Figure 3B:
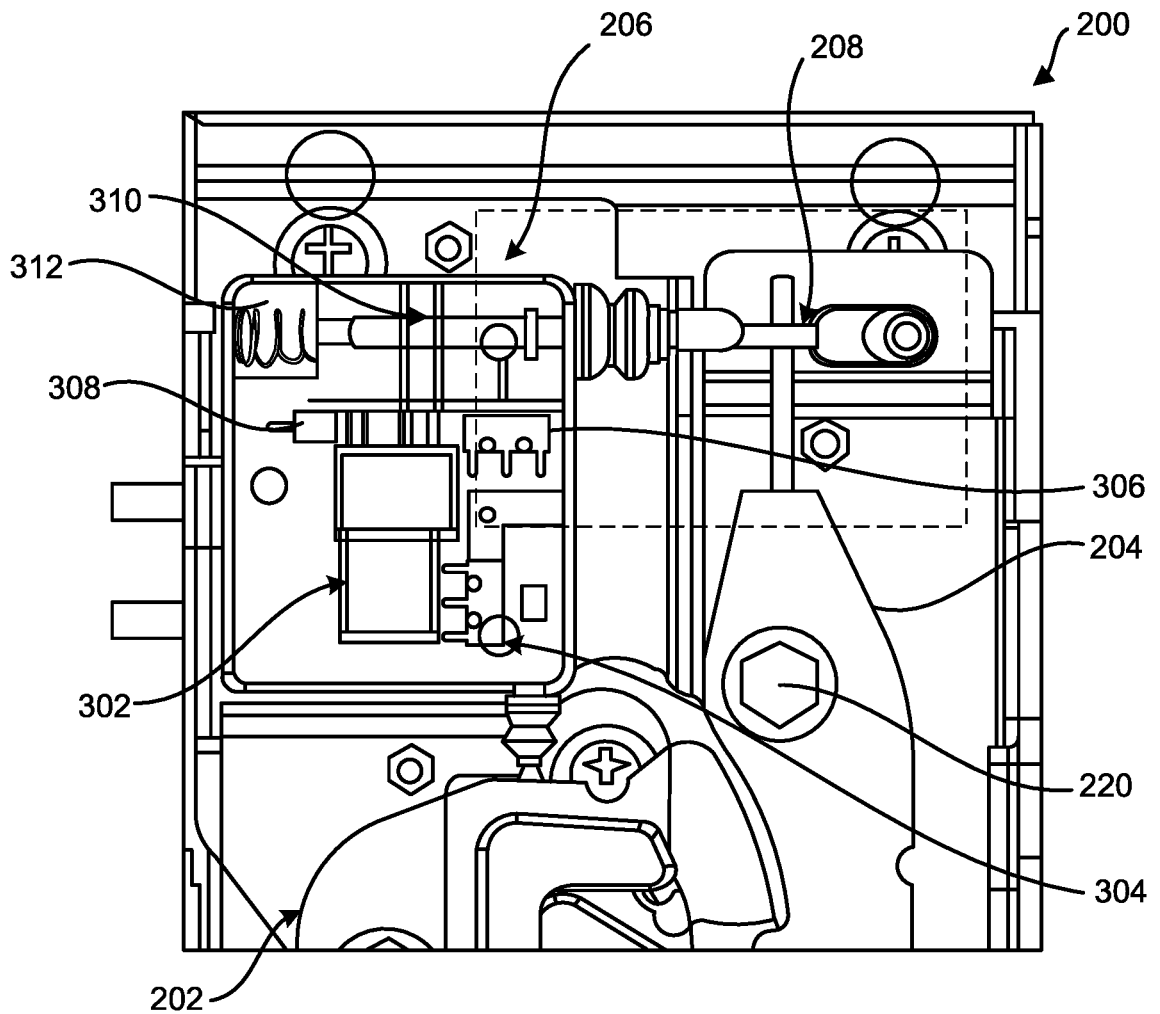
FIGS. 3B-3C illustrate partial top, and close-up partial top schematic views, respectively, of a portion of a low-power locking architecture with a low-power verification system, according to some embodiments.
Figure 3C:
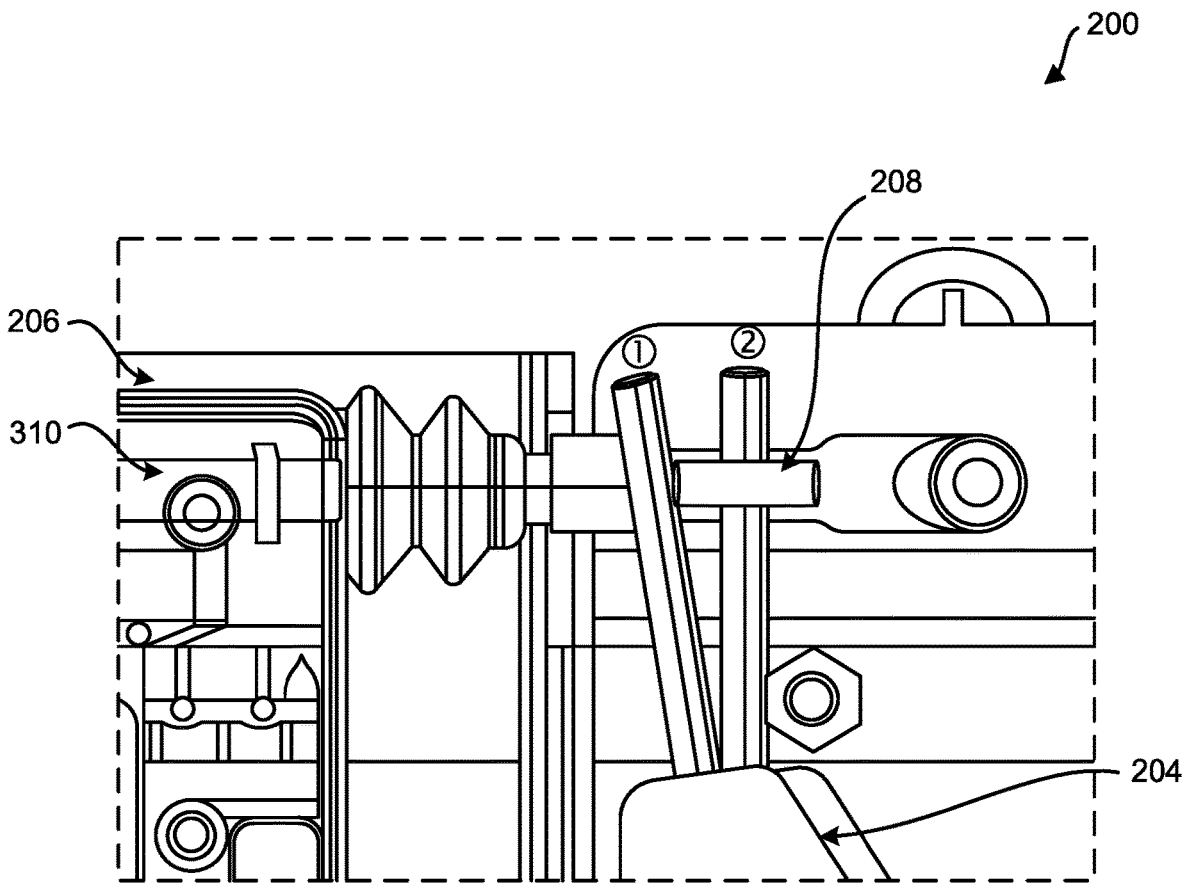

FIGS. 3A-3C illustrate top, bottom, and partial close-up schematic views, respectively, of particular embodiments of latching mechanism 200, wherein one or more of latch 202, hook 204, actuator 206, motor 302, latch switch 304, hook switch 306, and/or motor switch 308 may form a portion of a low-power locking architecture and a low-power verification system that enables docking station 100 to lock or unlock a micromobility vehicle 10 docked in docking station 100, and further provides verification with improved reliability, low operation costs, and flexibility for use in both high- or low-density areas.

Referring to one or more of FIGS. 3A-3C, actuator 206 comprises motor 302, latch switch 304, hook switch 306, and motor switch 308, and may include hook carriage 310 coupled to connector 208. Actuator 206 illustrated in FIGS. 3A-3C may be referred to as a linear actuator in particular embodiments.

A controller may signal motor 302 to rotate in a first direction to cause linear translation of connector 208 to a first position (Position 1) to rotate hook 204 to a hook unlatched position. A controller may signal motor 302 to rotate in a second direction to cause linear translation of connector 208 to a second position (Position 2) to rotate hook 204 to a hook latched position. In some embodiments, a controller may communicate with latch switch 304 to determine a position of latch 202. In some embodiments, a controller may communicate with hook switch 306 to determine a position of hook 204. In some embodiments, a controller may communicate with motor switch 308 to cause motor 302 to rotate. In some embodiments, a controller may communicate with motor switch 308 to determine an angular position or a rotational angle of an output shaft of motor 302. A controller may use information from latch switch 304, hook switch 306 and/or motor switch 308 to verify docking station 100 is configured properly for security of a micromobility vehicle 10 docked in docking station 100, discussed in greater detail below.

FIGS. 4A-4E illustrate bottom schematic views of an example latching mechanism 200 according to particular embodiments of actuator 206 with motor 302 coupled to cam 410, in which angular positioning of cam 410 may configure latching mechanism 200 in any of several states.

Figure 4A:
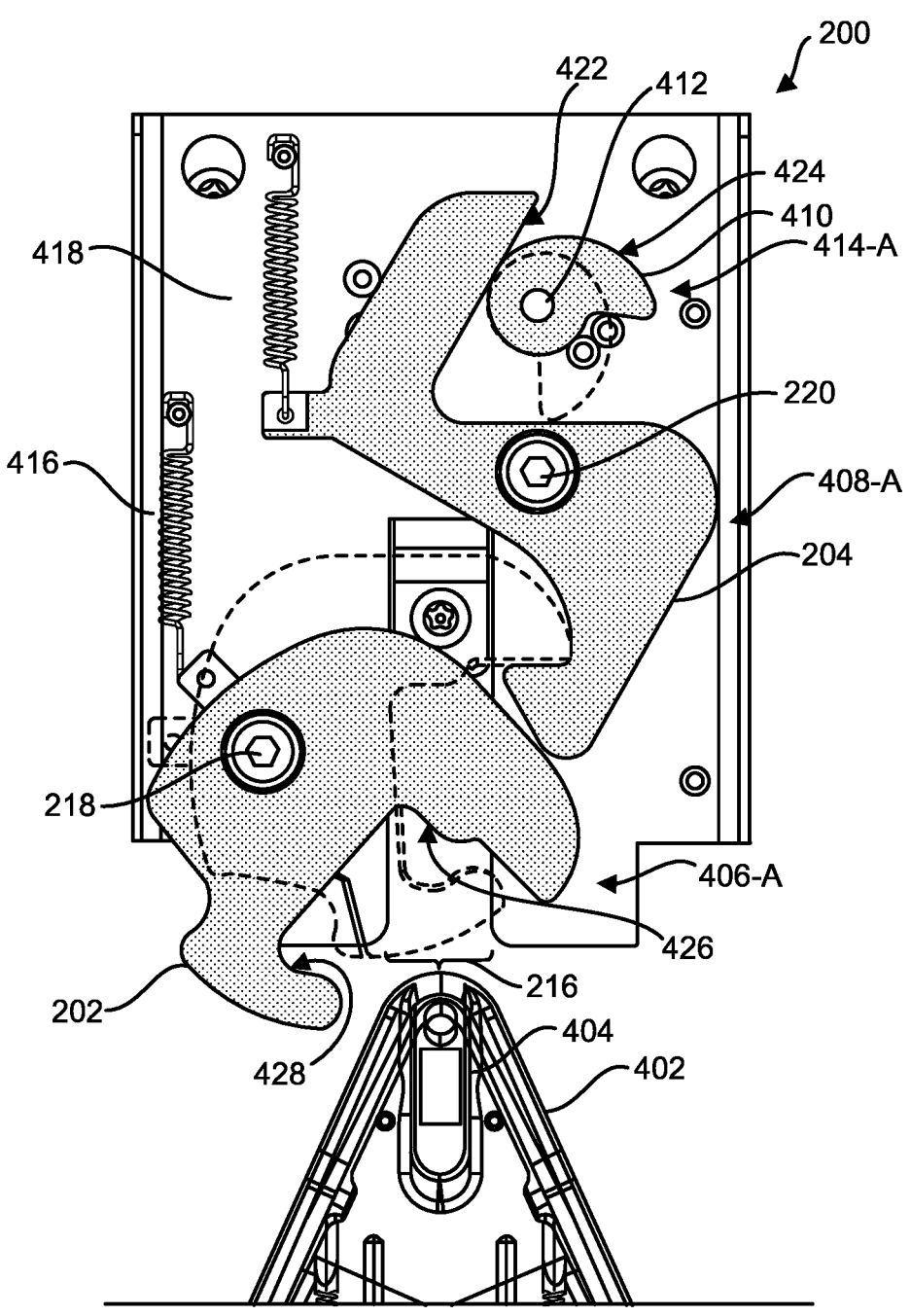
FIGS. 4A-4E illustrates bottom schematic views of a latching mechanism in various states and a portion of a low-power locking architecture, according to some embodiments.

FIG. 4A schematically illustrates latching mechanism 200 in an unlatched state. As illustrated in FIG. 4A, to configure latching mechanism 200 in an unlatched state, cam 410 may be rotated to a cam neutral position 414-A. When cam 410 is rotated to a cam neutral position, hook spring 418 biases hook 204 to rotate about hook axis 220 until first hook surface 422 contacts cam surface 424 or hook 204 contacts latch 202. Latch spring 416 biases latch 202 to a latch open position 406-A, whereby latching mount 402 on micromobility vehicle 10 may be advanced into latch 202 to allow extension 404 to contact latch surface 426.

When cam 410 is rotated to a cam neutral position, motor switch 308 may communicate a signal to a controller indicating cam 410 is in a cam neutral position, hook switch 306 may communicate a signal to the controller indicating hook 204 is in hook open position 408-A, and/or latch switch 304 may communicate a signal to the controller indicating latch 202 is in unlatched position 406-A. Information may be communicated to a user via interface 110 to let the user know the docking station 100 is available. Information may be communicated to a server configured for tracking the status of micromobility vehicles 10 and docking stations 100.

Figure 4B:
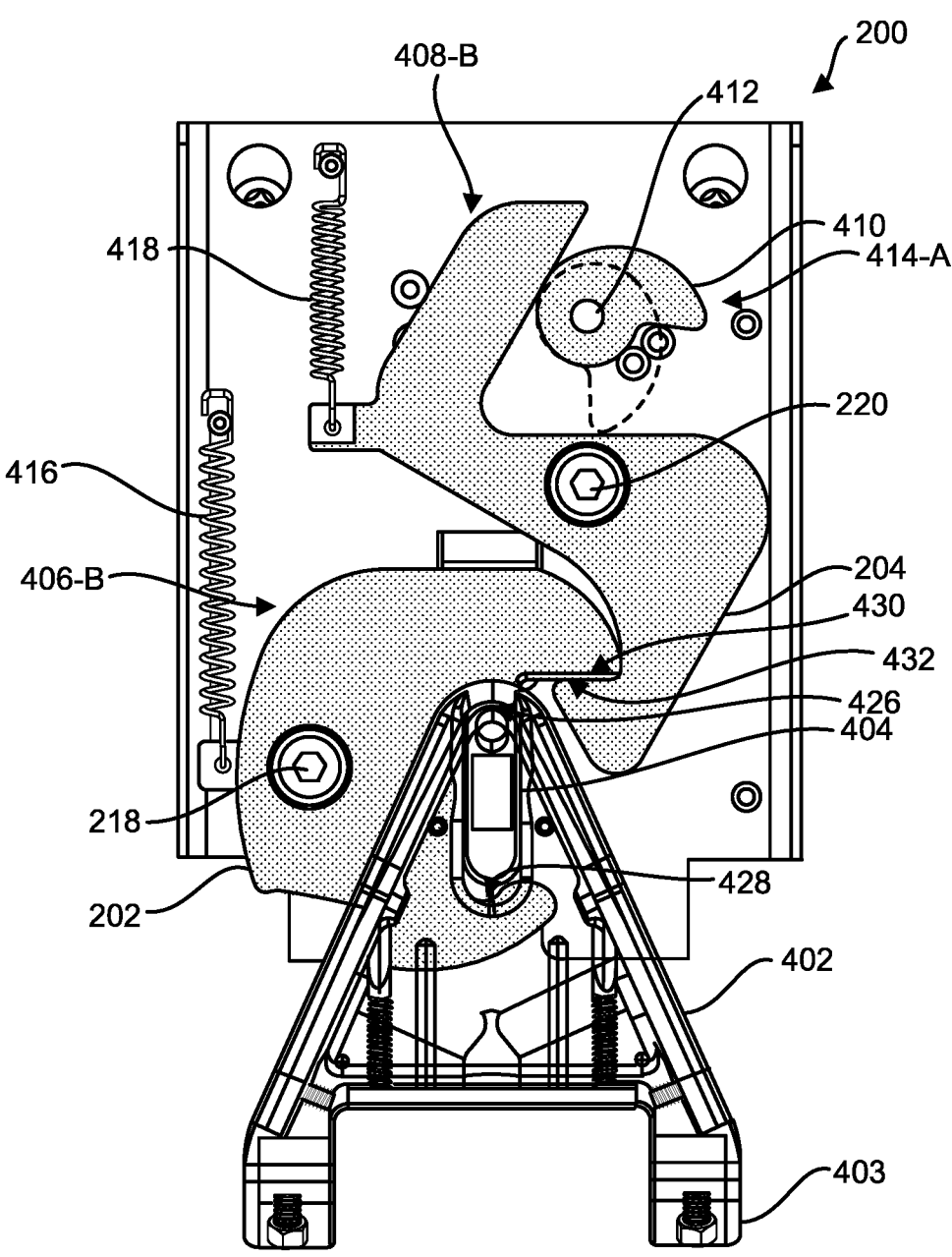

FIG. 4B schematically illustrates latching mechanism 200 in a latched state. As illustrated in FIG. 4B, cam 410 may be rotated to a cam neutral position 414-A, latch 202 is rotated about axis 218 to a latch closed position 406-B and hook 204 may be rotated to a hook engaged position 408-B, such as by hook spring 418 biasing hook 204 until surface 430 of hook 204 is in contact with surface 432 of latch 202. When surface 430 of hook 204 is in contact with surface 432 of latch 202, latch 202 is prevented from rotating to latch open position 406-A.

A controller may communicate a signal to motor 302 to cause motor 302 to rotate cam 410 to a cam neutral position 414-A, latch switch 304 may communicate a signal indicating latch 202 is in a latch closed position 406-B, hook switch 306 may communicate a signal indicating hook 204 is in a hook engaged position 408-A, and/or motor switch 308 may communicate a signal indicating cam 410 is in the cam neutral position 414-A. When latching mechanism 200 is in a latched state, if extension 404 is positioned between surfaces 426 and 428, micromobility vehicle 10 is considered to be docked and may not be withdrawn from docking station 100 without rotating latch 202 to the latch open position 406-A. The information may be communicated to a user via interface 110 to let the user know a micromobility vehicle 10 is properly docked to the docking station 100. The information may be communicated to a server configured for tracking the status of micromobility vehicles 10 and docking stations 100. Subsequent to the latched state, the controller may initiate an authentication or validation process to determine whether the micromobility vehicle 10 is to be locked to the docking station, as will be described in greater detail with reference to FIG. 4D.

Figure 4C:
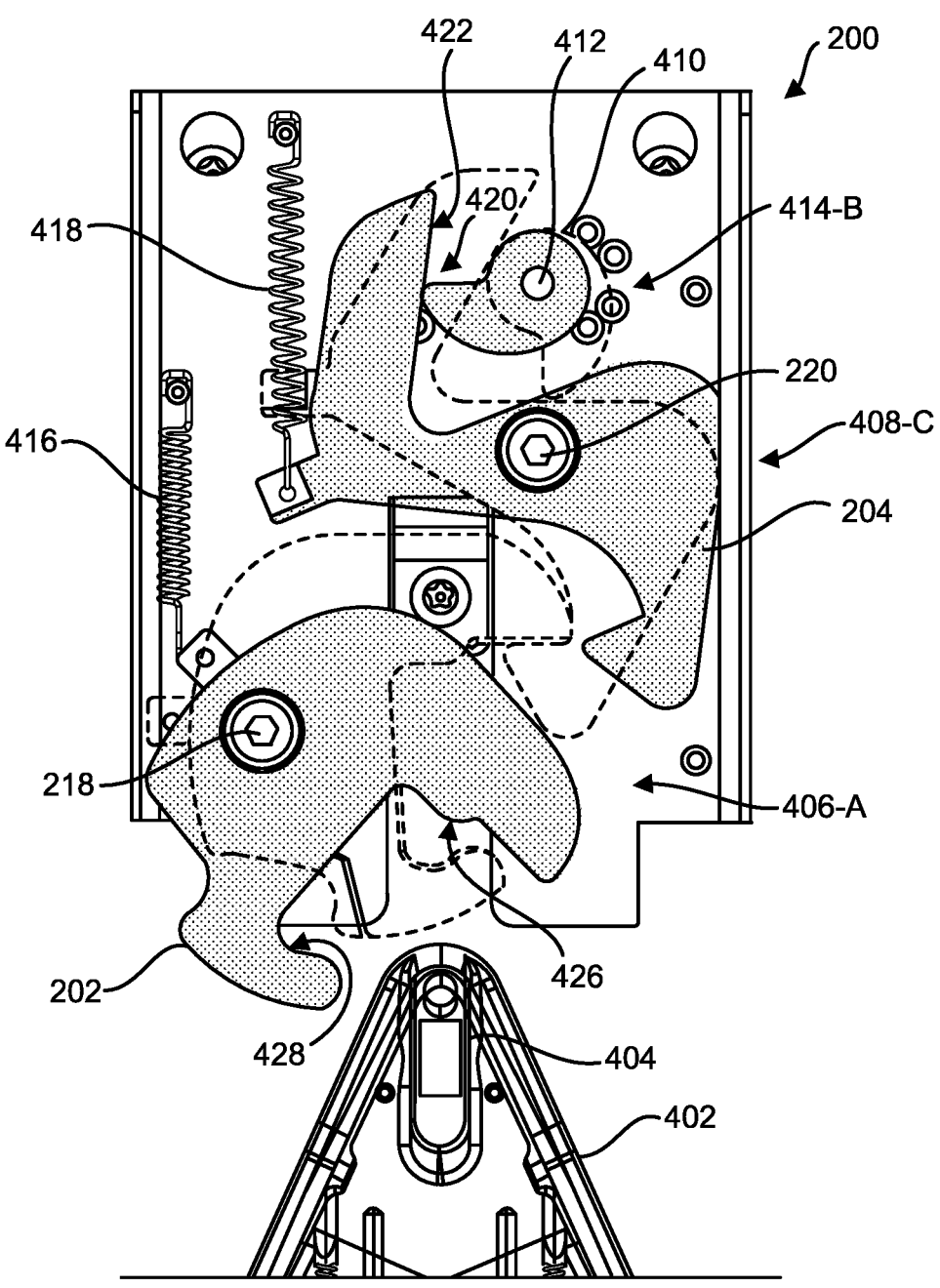

FIG. 4C schematically illustrates latching mechanism 200 in a hold-open state. As illustrated in FIG. 4C, cam 410 may be rotated to a cam hold-open position 414-B in which cam end 420 contacts first hook surface 422. When cam 410 is in the cam hold-open position 414-B, hook 204 is rotated to a hook hold-open position 408-C. When hook 204 is in a hook hold-open position 408-C, latch spring 416 biases latch 202 such that latch 202 is held in the latch open position 406-A.

Referring to FIG. 4C, motor 302 may rotate cam 410 to the cam hold-open position 414-B, latch switch 304 may communicate a signal indicating latch 202 is in a latch open position 406-A, hook switch 306 may communicate a signal indicating hook 204 is in a hook hold-open position 408-C, and/or motor switch 308 may communicate a signal indicating cam 410 is in the cam hold-open position 414-B. When latching mechanism 200 is in a hold-open state, extension 404 of latching mount 402 may be advanced into latching mechanism 200 but micromobility vehicle 10 is not considered docked and is not prevented from being removed from docking station 100. The information may be communicated to a user via interface 110 to let the user know the docking station 100 is unavailable. The information may be communicated to a server configured for tracking the status of micromobility vehicles 10 and docking stations 100.

Figure 4D:
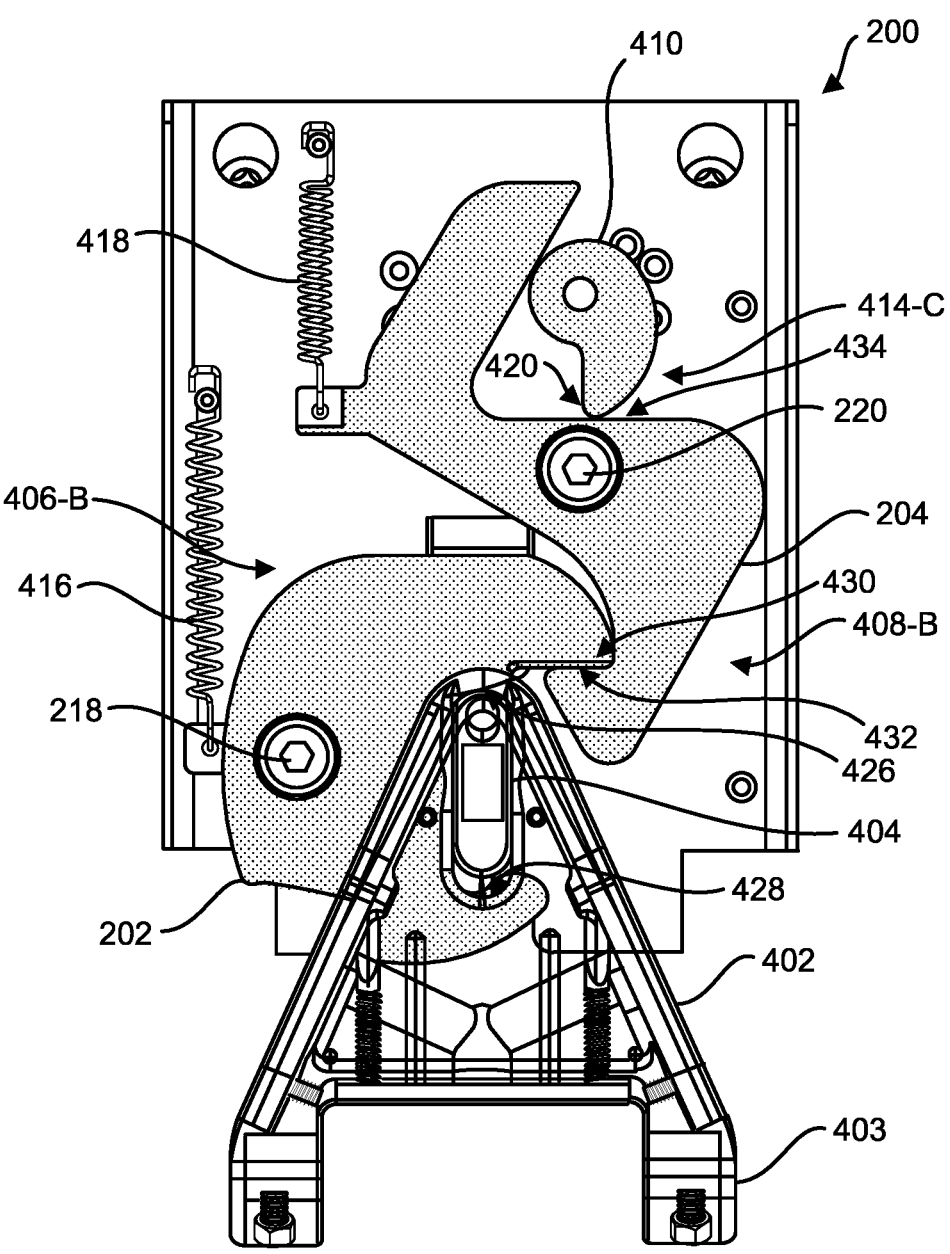

FIG. 4D schematically illustrates latching mechanism 200 in a locked state. As illustrated in FIG. 4D, to configure latching mechanism 200 in a locked state, cam 410 may be rotated to a cam locked position 414-C in which cam end 420 contacts second hook surface 434. When cam 410 is in the cam locked position 414-C, hook 204 is maintained in a hook engaged position 408-B such that surface 430 of hook 204 is maintained in contact with surface 432 of latch 202, which holds latch 202 in the latch closed position 406-B.

Referring to FIG. 4D, motor 302 may rotate cam 410 to the cam locked position 414-C, latch switch 304 may communicate a signal indicating latch 202 is in a latch closed position 406-B, hook switch 306 may communicate a signal indicating hook 204 is in a hook engaged position 408-B, and/or motor switch 308 may communicate a signal indicating cam 410 is in a cam locked position 414-C. When latching mechanism 200 is in a locked state and extension 404 is positioned between surfaces 426 and 428 in latch 202, extension 404 of latching mount 402 is prevented from being withdrawn from latching mechanism 200 such that micromobility vehicle 10 is locked and prevented from being removed from docking station 100. The information may be communicated to a user via interface 110. If a micromobility vehicle 10 is docked in the docking station 100, the information may be communicated to let the user know the micromobility vehicle 10 is reserved or unavailable. If a micromobility vehicle 10 is not docked in the docking station 100, the information may be communicated to let the user know the docking station 100 is unavailable. The information may be communicated to a server configured for tracking the status of micromobility vehicles 10 and docking stations 100.

If there are any failures or issues with latching mechanism 200, latching mechanism 200 may be prevented from being in one or more states described above. For example, as illustrated in FIG. 4E, if hook spring 418 is broken or removed, hook 204 may be able to rotate or may not be locked, preventing a user from docking a micromobility vehicle 10 in docking station 100.

Figure 4E:
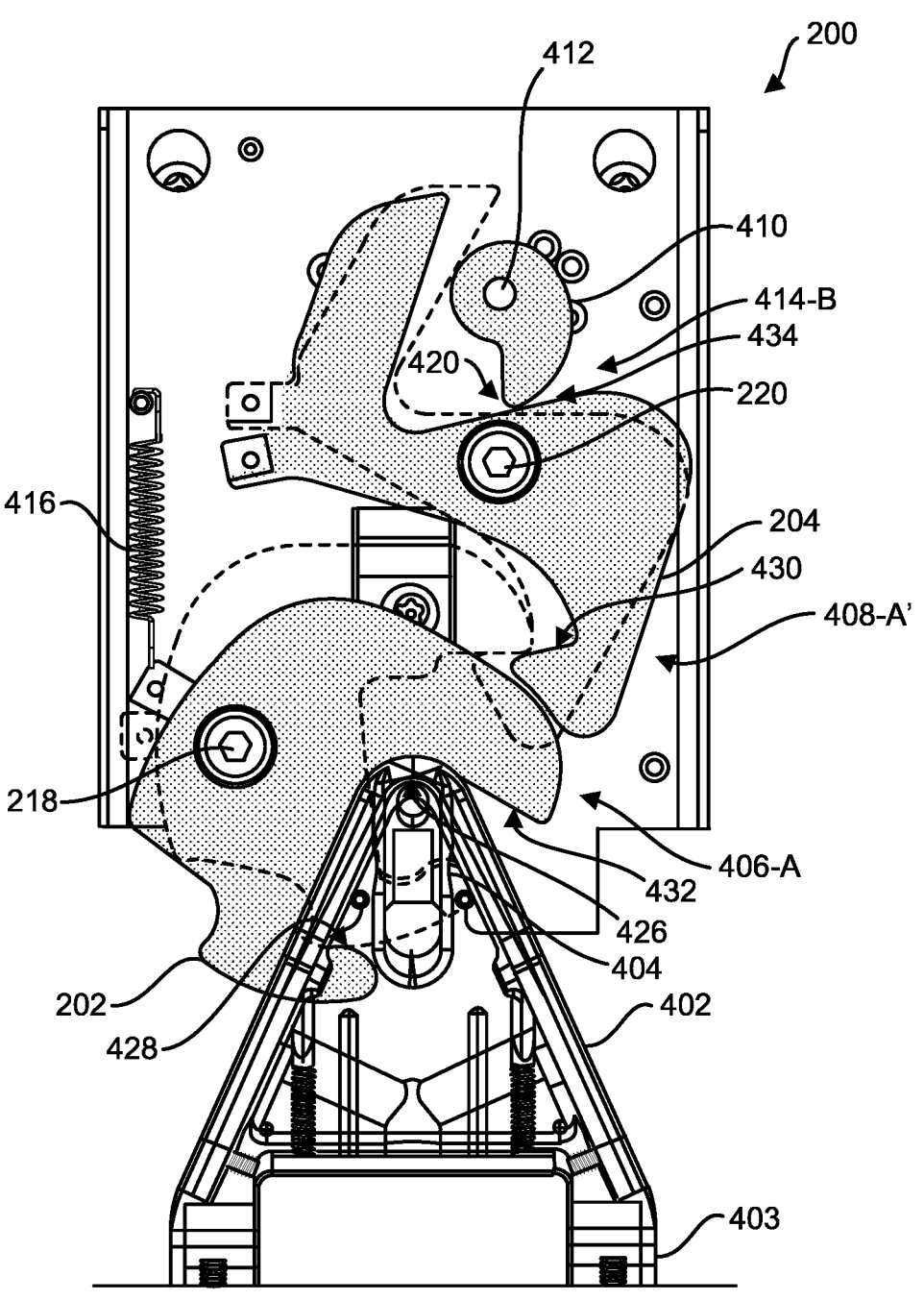

FIG. 4E schematically illustrates latching mechanism 200 in a possible fault condition state or lockout state. As illustrated in FIG. 4E as a non-limiting example, latching mechanism 200 may be in a fault condition state if hook spring 418 is broken or missing. As described herein, in the lockout state, if hook 204 cannot be maintained in a hook-engaged position 408-B, a micromobility vehicle 10 advanced into the docking station 100 cannot be locked and may not be docked properly. To prevent a micromobility vehicle 10 from being positioned in a docking station 100 that is unable to lock the micromobility vehicle 10, embodiments may configure latching mechanism 200 to prevent a micromobility vehicle 10 from being positioned in the docking station 100. Embodiments may communicate with latch switch 304, hook switch 306, and/or motor switch 308 to verify a fault condition. If hook switch 306 communicates a signal indicating hook 204 is in a hook disengaged position 408-A', communicates an error signal, or does not communicate any signal, embodiments may determine there is a fault condition associated with hook 204 and may communicate a signal to rotate cam 410 to a cam locked position 414-C in which cam end 420 contacts hook surface 434. Motor switch 308 may communicate a signal indicating cam 410 is in a cam locked position 414-C. Latch 202 may be freely rotated to a latch open position 406-A but cannot be rotated to a latch closed position 406-B such that a micromobility vehicle 10 cannot be docked or locked in the docking station 100. The information may be communicated to a user to let the user know the docking station 100 is unavailable or the micromobility vehicle 10 is not docked or not locked. The information may be communicated to a server configured for tracking the status of micromobility vehicles 10 and docking stations 100.

Figure 5:
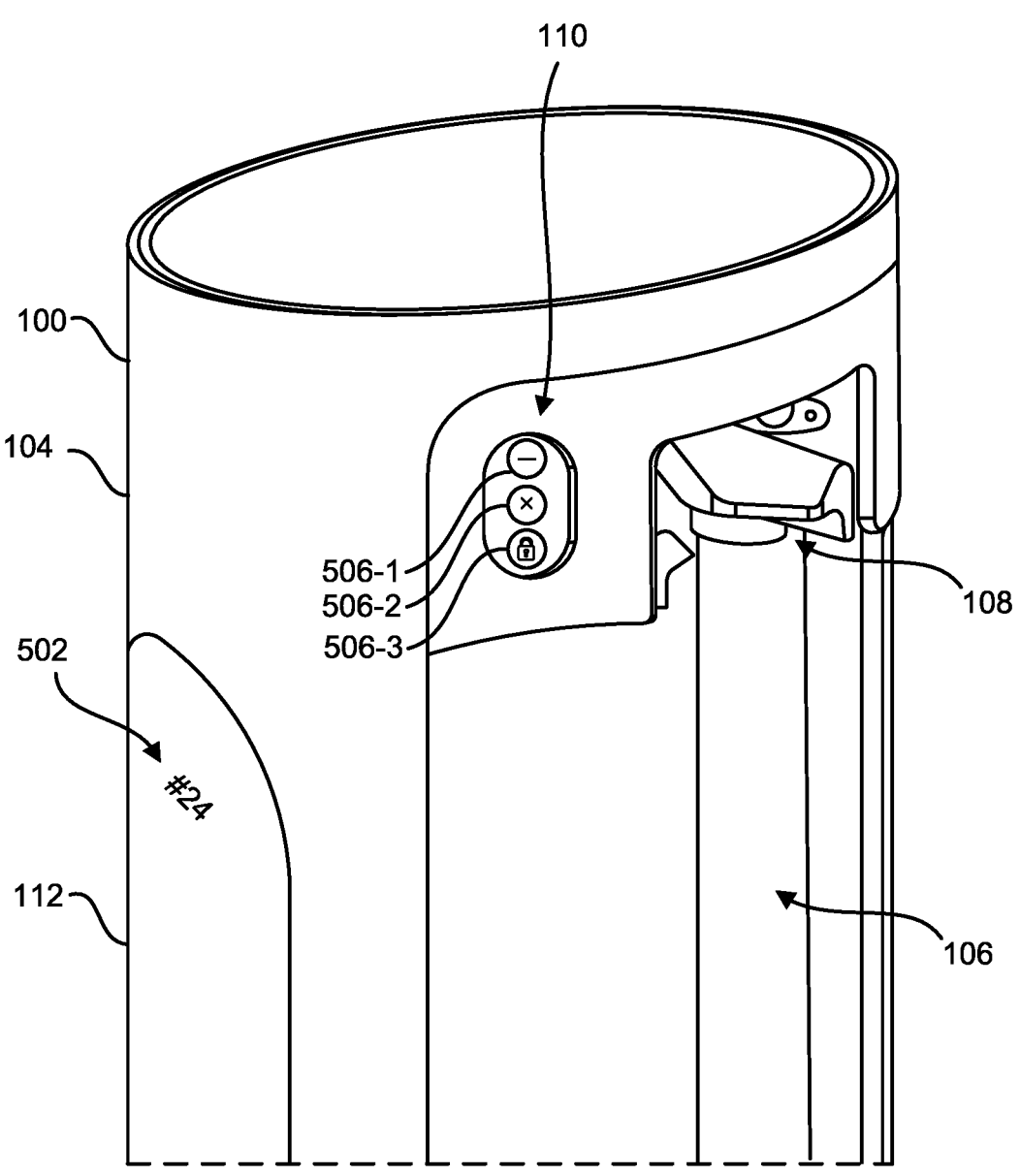
FIG. 5 illustrates a schematic view of a portion of a docking station, according to some embodiments.

FIG. 5 schematically illustrates a portion of one embodiment of a docking station 100 comprising a housing, a vertically oriented solar panel 112, a micromobility vehicle opening 106 and a receiver 108, and further comprising an identification panel 502 and interface 110 comprising a plurality of low-power indicators 506. The use of low-power indicators 506 on the interface 110 enables the docking station 100 to continuously present a status of the docking station 100 without concern for drawing excessive amounts of power from the battery that would otherwise prematurely deplete the battery and impact the operation of the locking architecture or the operation of the communication module.

In particular embodiments, the use of flip-discs as the low-power indicators 506 may impart advantages over light emission-based interfaces used in conventional docking stations, including higher contrast visibility, higher reliability, and lower power consumption (relative to light-emitting diodes).

Power to a low-power security system may be supplied by solar panels 112 on a docking station. In particular embodiments, a solar panel 112 may comprise a light-absorbing surface that includes photovoltaic cells, which are electrical devices that convert light energy into electricity by the photovoltaic effect.

In particular embodiments, a docking station 100 may comprise a battery (not shown) to store the energy harvested from solar panels 112, and/or a communication module for communicating wirelessly with external devices or systems (e.g., bike transportation management system). In particular embodiments, the battery may comprise one or more lithium batteries, one or more AA batteries, and/or one or more cell batteries, such as 18650 batteries.

In particular embodiments, receiver 108 includes latching mechanism 200 and further includes features for facilitating insertion of latching mount 402 of micromobility vehicle 10 into latching mechanism 200.

Docking station 100 may communicate information to a user via interface 110. In particular embodiments, interface 110 includes low-power indicators 506 such as flip dots. In particular embodiments, interface 110 includes visual indicators such as a display capable of presenting text or graphics to a user, and may further include audio components such as a microphone and speaker for receiving and communicating with a user. In particular embodiments, interface 110 includes an NFC (Near Field Communications) interface for enabling a user to submit payment information.

The interface 110 may present a status of the docking station 100. The interface 110 may be in communication with the latching mechanism 200 and the locking mechanism. The interface 110 may receive a signal from a controller for indicating a status of whether the micromobility vehicle is latched to the docking station 100 or locked to the docking station 100.

In particular embodiments, when a user requests a micromobility vehicle from a docking station, a server may select a particular micromobility vehicle docked at a station based on the user's origination location, destination location (e.g., specified by a user), estimated duration of the trip, user's preference of a micromobility vehicle (e.g., electrically-powered micromobility vehicle or not electrically-powered micromobility vehicle), and/or the amount of charge left on the electrically-powered micromobility vehicles. For example, if a user requests an electrically-powered micromobility vehicle, a server may analyze the amount of charge left on each of the docked micromobility vehicles and select one that is sufficiently charged. If a user requests an electrically-powered micromobility vehicle at a docking station without charging capability and the docking station at the destination location is capable of charging, a server may select an electrically-powered micromobility vehicle that has low charge but is still capable of reaching the destination location so the micromobility vehicle can be charged when the user finishes the ride. In some embodiments, when a user requests a micromobility vehicle from a docking station, a server may provide a user with all of the micromobility vehicles that are available at the docking station to allow the user to select any particular micromobility vehicle that is available and reserve that micromobility vehicle for the user.

The reserved micromobility vehicle may then be held unavailable for a maximum time period (e.g., 5-30 minutes) before being made available to other users.

Figure 6:
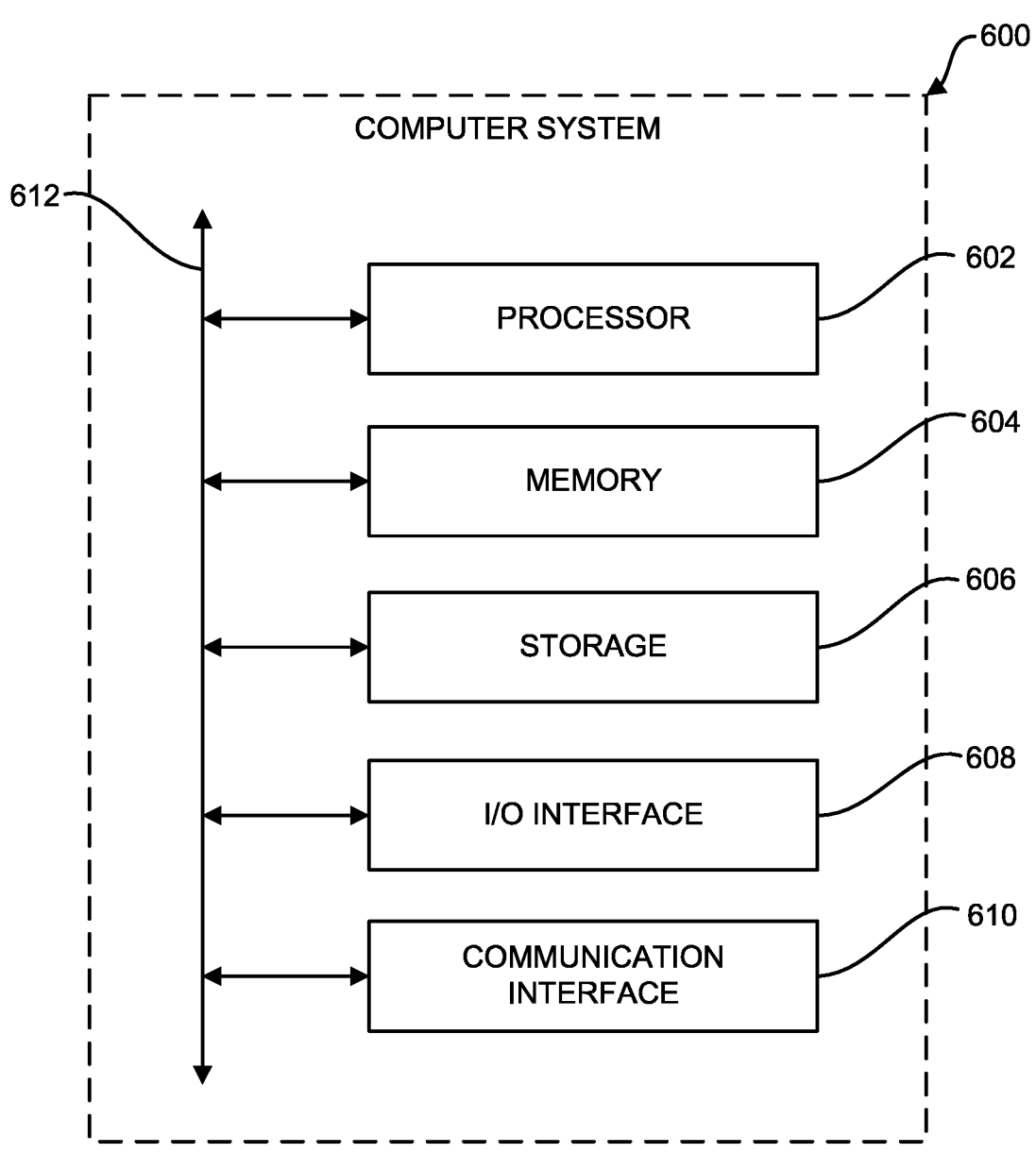
FIG. 6 illustrates a schematic of an example computer system of a docking station, according to some embodiments.

FIG. 6 schematically illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The computer program may execute instructions for performing a validation/authentication process of a micromobility vehicle, as described herein. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, and/or addresses. This disclosure contemplates processor 602 including any suitable number of any suitable internal caches, where appropriate.

As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604.

In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A low-power docking station for a micromobility vehicle, the low-power docking station comprising:
  a housing having walls that define a vehicle opening configured to receive a portion of the micromobility vehicle;
  a latching receiver configured to engage with a latching mount of the micromobility vehicle when the portion of the micromobility vehicle is positioned in the vehicle opening, the latching receiver comprising:
    a movable hook comprising a retention feature, and
    a movable latch comprising a latching protrusion and a receiving feature, the receiving feature configured to receive the latching mount when the latching mount is advanced into the receiving feature, and in response to the receiving feature receiving the latching mount, the movable latch is configured to move such that the latching protrusion of the movable latch is retained by the retention feature of the movable hook; and
  a low-power locking architecture coupled to the latching receiver and capable of locking the micromobility vehicle via the latching receiver, the low-power locking architecture comprising:
    an actuator for positioning the movable hook in a first position for engaging the movable latch and a second position for disengaging the movable hook from the movable latch; and
    a low-power interface disposed on the housing and configured to provide a status of the latching receiver in response to the micromobility vehicle being locked via the latching receiver.

2. The docking station of claim 1, wherein the actuator comprises a linear actuator or a rotary actuator.

3. The docking station of claim 1, wherein, prior to the low-power locking architecture locking the micromobility vehicle, the low-power locking architecture is configured to determine whether the micromobility vehicle is authorized to be latched to the docking station.

4. The docking station of claim 1, the low-power locking architecture further comprising a motor configured to provide a selective switching of the movable hook between the first position and the second position based on a signal received from a controller.

5. The docking station of claim 4, the low-power locking architecture further comprising a motor switch corresponding to the motor, a hook switch corresponding to the movable hook, and a latch switch corresponding to the movable latch, wherein each of the motor switch, the hook switch, and the latch switch is communicatively coupled with the controller and configured to provide a respective positional information to the controller.

6. A low-power docking station for a micromobility vehicle, the low-power docking station comprising:
  a housing having walls that define a vehicle opening capable of receiving a portion of the micromobility vehicle;

a latching receiver configured to engage with a latching mount of the micromobility vehicle when the portion of the micromobility vehicle is positioned in the vehicle opening, the latching receiver comprising:
    a movable hook comprising a retention feature,
    a rotatable cam configured to selectively engage with the movable hook, and
    a movable latch comprising a latching protrusion and a receiving feature, the receiving feature configured to receive the latching mount when the latching mount is advanced into the receiving feature, and in response to the receiving feature receiving the latching mount, the movable latch is configured to move such that the latching protrusion of the movable latch is retained by the retention feature of the movable hook; and
  a low-power locking architecture coupled to the latching receiver and capable of locking the micromobility vehicle via the latching receiver, the low-power locking architecture comprising:
    an actuator for rotating the rotatable cam among a plurality of cam positions; and
    a low-power interface disposed on the housing and configured to provide a status of the latching receiver.

7. The docking station of claim 6, further comprising a hook biasing member and a latch biasing member, wherein the movable hook is biased toward a first hook position by the hook biasing member and the movable latch is biased toward a first latch position by the latch biasing member.

8. The docking station of claim 7, wherein the hook biasing member and the latch biasing member each comprise a respective spring.

9. The docking station of claim 6, wherein in a first cam position of the plurality of cam positions, the rotatable cam engages with the movable hook such that the movable latch is configured to receive the latching mount of the micromobility vehicle when the latching receiver is unoccupied by the micromobility vehicle, and such that the movable latch retains the latching mount of the micromobility vehicle when the latching mount is advanced into the receiving feature of the movable latch, thereby latching the micromobility vehicle.

10. The docking station of claim 7, wherein in a first cam position of the plurality of cam positions, the movable latch is retained at a second latch position by the retention feature of the movable hook when the latching mount is advanced into the receiving feature, thereby latching the micromobility vehicle, the movable latch retained against a biasing action of the latch biasing member.

11. The docking station of claim 6, wherein in a second cam position of the plurality of cam positions, the rotatable cam engages with the movable hook such that the movable latch prevents retention of the latching mount when the latching mount is advanced into the receiving feature, or such that the movable latch releases the latching mount.

12. The docking station of claim 7, wherein in a second cam position of the plurality of cam positions, the rotatable cam acts to position the movable hook at a second hook position against a biasing action of the hook biasing member.

13. The docking station of claim 6, wherein in a third cam position of the plurality of cam positions, the rotatable cam engages with the movable hook such that the movable hook prevents a positional change of the movable latch, thereby preventing the movable latch from receiving the latching mount when the latching receiver is unoccupied by the micromobility vehicle, and thereby locking the latching mount within the latching receiver when the latching receiver is occupied by the micromobility vehicle.

14. The docking station of claim 6, wherein, prior to the low-power locking architecture locking the micromobility vehicle, the low-power locking architecture is configured to determine whether the micromobility vehicle is authorized to be docked to the docking station.

15. The docking station of claim 6, the low-power locking architecture further comprising a motor configured to selectively rotate the rotatable cam based on a corresponding signal received from a controller.

16. The docking station of claim 6, the low-power locking architecture further comprising a motor switch corresponding to the motor and the rotatable cam, a hook switch corresponding to the movable hook, and a latch switch corresponding to the movable latch, wherein each of the motor switch, the hook switch, and the latch switch is communicatively coupled with the controller and configured to provide a respective positional information to the controller.

17. A method of operating a low-power docking station for a micromobility vehicle, the method comprising the steps of:

determining whether the micromobility vehicle is authorized to be docked to a latching receiver of the docking station; and in a first position of a rotatable cam of the latching receiver, receiving, by a movable latch of the latching receiver and based on the latching receiver being unoccupied, a latching mount of the micromobility vehicle, wherein the rotatable cam is selectively engagable with a movable hook having a retention feature, and wherein the movable latch has a latching protrusion and a receiving feature, the receiving feature configured to selectively receive the latching mount, the latching protrusion of the movable latch selectively retainable by the retention feature of the movable hook; and retaining, by the movable latch and based on the latching receiver being occupied, the latching mount of the micromobility vehicle;

in a second position of the rotatable cam, preventing retention, by the movable latch and based on the latching receiver being unoccupied, of the latching mount of the micromobility vehicle; and releasing, by the movable latch and based on the latching receiver being occupied, the latching mount of the micromobility vehicle; and in a third position of the rotatable cam, preventing receipt, by the movable latch and based on the latching receiver being unoccupied, of the latching mount of the micromobility vehicle; and locking, by the movable latch and based on the latching receiver being occupied, the latching mount of the micromobility vehicle.

18. The method of claim 17, further comprising:

biasing, by a hook biasing member, the movable hook toward a first hook position; and biasing, by a latch biasing member, the movable latch toward a first latch position.

19. The method of claim 17, further comprising:

selectively sensing, by a controller and based on one or more of a motor switch, a hook switch, and a latch switch communicatively coupled with the controller, a respective positional information corresponding to one or more of the rotatable cam, the movable hook, and the movable latch.

20. The method of claim 17, further comprising:

providing, by a low-power interface of the docking station, a status of the latching receiver.

\* \* \* \* \*